United States Patent [19]  
Kakii et al.

[11] Patent Number: 4,818,059  
[45] Date of Patent: Apr. 4, 1989

[54] OPTICAL CONNECTOR AND SPLICER

[75] Inventors: Toshiaki Kakii; Yasuo Asano; Shuzo Suzuki, all of Kanagawa, Japan

[73] Assignee: Sumitomo Electric Industries, Ltd., Osaka, Japan

[21] Appl. No.: 25,840

[22] Filed: Mar. 13, 1987

[30] Foreign Application Priority Data

| Mar. 14, 1986 | [JP] | Japan | 61-57984 |
| May 16, 1986 | [JP] | Japan | 61-113331 |
| Aug. 26, 1986 | [JP] | Japan | 61-200409 |
| Aug. 29, 1986 | [JP] | Japan | 61-204289 |
| Sep. 26, 1986 | [JP] | Japan | 61-229238 |
| Oct. 31, 1986 | [JP] | Japan | 61-261403 |

[51] Int. Cl.⁴ ............................................. G02B 6/38
[52] U.S. Cl. ............................... 350/96.21; 350/96.20
[58] Field of Search ............... 350/96.20, 96.21, 96.22; 357/30

[56] References Cited

U.S. PATENT DOCUMENTS

| 3,864,018 | 2/1975 | Miller | 350/96.21 |
| 3,871,935 | 3/1975 | Gloge et al. | 350/96.21 |
| 4,046,454 | 9/1977 | Pugh, III | 350/96.21 |
| 4,111,522 | 9/1978 | Auracher et al. | 350/96.21 |
| 4,142,776 | 3/1979 | Cherin et al. | 350/96.21 |
| 4,323,300 | 4/1982 | Stewart et al. | 350/96.21 |
| 4,475,790 | 10/1984 | Little | 350/96.21 |
| 4,487,474 | 12/1984 | Nishie et al. | 350/96.21 |
| 4,583,819 | 4/1986 | Duesbury | 350/96.21 |
| 4,588,257 | 5/1986 | Maranto | 350/96.21 |
| 4,594,471 | 6/1986 | Yamazaki | 136/249 |
| 4,662,713 | 5/1987 | Davies et al. | 350/96.20 |
| 4,737,009 | 4/1988 | Kakii et al. | 350/96.20 |

Primary Examiner—William L. Sikes  
Assistant Examiner—Frank González  
Attorney, Agent, or Firm—Cushman, Darby & Cushman

[57] ABSTRACT

An optical connector and splicer including an optical fiber positioning member for optical coupling of optical fibers where the coupling is assisted by at least two guide pins. The optical fiber positioning member comprises a substrate plate and a flat plate. The substrate plate has optical fiber grooves and guide pin grooves each formed at one surface thereof for positioning the one optical fibers and said guide pins, respectively. The flat plate has a flat surface confronting with the grooved surface of the substrate plate. An exposed area is formed on a part of the substrate plate where said flat plate is not joined for facilitating an insertion of the optical fibers into the optical fiber grooves. A method of the optical connector and splicer comprises the steps of: preparing a substrate plate assembly form a single wafer made of a hard and brittle material; continuously forming a predetermined pattern of optical fiber grooves and guide pin grooves on a surface of said substrate plate assembly; bonding at least one flat plate to said surface of said substrate plate assembly with an adhesive thin layer, so that optical fiber groove holes and guide pin groove holes are provided; cutting a bonded assembly into sections each having predetermined dimensions of said positioning member; and fixing the optical fibers in said optical fiber groove holes by bonding with an adhesive.

16 Claims, 15 Drawing Sheets

OPTICAL CONNECTOR AND SPLICER

BACKGROUND OF THE INVENTION

1. Field of the Invention

The present invention relates to an optical connector and splicer that allow multiple optical fibers to be coupled precisely when connecting or switching operation is performed on lightwave communication systems. The present invention also relates to a method of producing such connector and splicer. The connector is used to detachably couple optical fibers and the splicer is used to permanently couple optical fibers.

2. Prior Art

FIGS. 1A and 1B show the concept of the conventional structure of a multi-fiber optical connector ferrule which uses two guide pins in connecting arrays of coated optical fibers (ribbon fiber). FIG. 1A is a top view of the conventional structure and FIG. 1B is a side view as seen from the side indicated by arrows $X_3$—$X_3$ in FIG. 1A.

In FIGS. 1A and 1B, the numeral 10 denotes an array of coated optical fibers; 11 is an individual bare optical fiber; 21 is a connector ferrule, 22 is a guide pin, and 23 is a guide pin hole into which the guide pin 22 provided on the ferrule 21 is to be inserted.

The multi-fiber optical connector ferrule 21 is entirely formed by plastic molding and features a positioning accuracy of 3-4 $\mu$m or below that can be attained by employing precisely dimensioned molds and an appropriate molding technique. The connector ferrule shown in FIGS. 1A and 1B assumes that each of the coated fiber arrays to be connected contains five optical fibers 11 which are arranged linearly at a pitch of 0.3 mm. The guide pins 22 each having a diameter of 0.7 mm$\phi$ are spaced from each other at a pitch of 3.6 mm.

Simultaneous coupling of the optical fibers 11 can be achieved in the following manner: two guide pins 22 are inserted into guide pin holes 23 formed in one connector ferrule, then inserted into the corresponding holes in the other ferrule which is positioned in registry with the first ferrule. The two ferrules 21 coupled in this way are fixed securely by a suitable means such as a clamp which presses the rear end of each ferrule and the assembly is then accommodated in a cylindrical housing.

The multi-fiber optical connector ferrule 21 is fabricated by die molding, which proceeds as follows: molding pins each having a slightly larger outside diameter than an individual optical fiber 11 and molding rods that are intended to form holes 23 for insertion of guide pins are arranged on a positioning member in a mold; a molding resin is transfermolded into the cavity and left to stand until it cures; subsequently, the molding pins and molding rods are withdrawn so that fiber guide holes and guide pin insertion holes are left behind in the positioning member. The molding resin may be an epoxy resin which can be shaped at low pressures.

Being entirely formed by plastic molding, the prior art multi-fiber optical connector has the following problems.

(1) In plastic molding, variations in the ratio of resin shrinking is unavoidable because of the change in material or variation in the molding pressure and temperature conditions and it is impossible to achieve consistent production with the pitch and position accuracies of the shaped article being held to 1 $\mu$m or below;

(2) Long and undistorted holes for guiding optical fibers are not easy to form with molding pins whose diameter is as small as 0.125 mm$\Phi$ and the fiber guide hole length that can be attained is within the range of 1 to 2 mm, with the extreme difficulty being encountered in making longer holes ($\geq$4-5 mm). That is, because of the molding pressure used or the offsetting in the position of molding pins relative to the positioning member, the molding pins will deform to produce deformed optical fiber guide holes, and this will lead to an increased coupling loss due to fiber bending;

(3) Plastic materials do not have high dimensional stability and it is very difficult to ensure that the dimensional change that occurs during molding as a result of moisture absorption or in the face of a change in temperature that amounts to 100° C. (i.e., from −30° C. to +70° C.) will not exceed 1 $\mu$m;

(4) Aligned coupling of connector ferrules is accomplished by inserting guide pins into corresponding guide pin holes in the ferrules. However, the guide pin holes which are formed by resin molding are prone to wear or be damaged or otherwise deformed when metal guide pins are inserted into these holes. As a result, dimensions on the submicron order cannot be precisely maintained and great difficulty is encountered in realizing high-precision coupling of optical fibers;

(5) Resins are also subject to much greater thermal expansion than the quartz of which the optical fibers are made and this increases the change of the occurrence of an increased internal loss as a result of temperature variations; and (6) Dimensional measurement and evaluation of the manufactured connector ferrule can only be achieved with extreme difficulty because the ferrule which is formed by resin molding has sagging end edges the defy precise measurements on the submicron order.

In order to achieve high-precision coupling of optical fibers with the multi-fiber optical connector of the type described above, the clearance between the guide pin hole 23 and the guide pin 22 is desirably as small as possible and, in the actual connecting operation, it is necessary to use guide pins that provide a clearance of no greater than 1 $\mu$m. However, if, as shown in FIG. 2A, the pitch (P1) between the two guide pin holes 23 in one ferrule 21 is larger than the pitch P2 between the guide pin holes in the other ferrule by, for example, 4 $\mu$m, the end surfaces of the two ferrules will have perfect contact with each other and some gap g will be left between the two ferrules as shown in FIG. 2B. The amount of gap g produced could be reduced by exerting an increased pressure when coupling the two ferrules but if the pressure applied is excessive, either the ferrule or the guide pins themselves will break.

Further, FIG. 3 is a sectional view of a multi-fiber silicon chip array connector 31 which is conventionally used as an optical fiber connecting member. Two silicon chip guides 32 that are etched on both surfaces are stacked on each other, with optical fibers 11 being aligned on the mating surfaces. A silicon guide plates 33 having coupling guide grooves is fitted onto the other surface of each silicon chip guide 32 and the assembly is fixed with a clip plate (not shown) to secure the coupling of the fibers.

The aforementioned silicon chip array connector of optical fibers has the following problems.

(1) In order to assemble the connector, optical fibers 11 are placed on one etched silicon chip guide 32, and the other silicon chip guide 32 is placed in alignment with the fibers. This process involves much difficulty when multiple optical fibers have to be placed in as many grooves. What is more, any dust particles entrapped between the grooves and the fibers will cause dimensional errors. In short, the conventional silicon chip array connector has problems in association with the ease of assembly and the introduction of dimensional errors during assembly.

(2) Fiber coupling is achieved using guide grooves formed by etching but the coupled fibers must be subsequently clamped with a clip plate. Therefore, the array connector cannot be connected or disconnected or switched to another channel as readily as in the case of ordinary fiber connectors.

(3) Silicon is a hard material but, as the same time, it is brittle and will be readily nicked at side edges to make it difficult to achieve precisely guided coupling of fibers.

(4) The components of the assembled fiber coupling member are simply joined with a clip plate, so that they may separate if exposed to wet heat. In other words, the joint provided by the coupling member is not highly reliable.

SUMMARY OF THE INVENTION

An object of the invention is to provide a multi-fiber optical connector ferrule that is free from the aforementioned problems.

Another object of the present invention is to provide an optical fiber connector ferrule with a positioning member, the positioning member being provided with grooves for assisting in the positioning of individual optical fibers and guide pins, and comprising a guide substrate and a cover plate each being made of a hard and brittle material. The hard and brittle material means glass, super-hard alloy, cermet, ceramics (oxide, carbide, nitride), single crystal, polycrystal or the like.

A further object of the present invention is to provide an optical fiber connector ferrule having a guide substrate provided with optical fiber grooves and guide pin grooves and a guide plate that is to be placed on said guide substrate to define groove holes, said guide substrate being longer than said guide plate such that when they are placed on each other in registry at one end, part of the optical fiber guide grooves will become exposed, the substrate and the plate being bonded together with a thin layer of adhesive.

A still further object of the present invention is to provide a process for producing a multi-fiber optical connector ferrule that comprises the following steps: preparing a guide substrate assembly from a single wafer of hard and brittle material by continuously performing grinding with the same machining tool such as to form a predetermined pattern of optical fiber guide grooves and guide pin grooves in the surface of said wafer; bonding one or more flat-surfaced plates to predetermined areas of said guide substrate assembly by means of a thin layer of adhesive; cutting the bonded assembly into sections each having the predetermined dimensions of a guide capillary; and subsequently fixing optical fibers in said optical fiber guide grooves by bonding with an adhesive.

A still further object of the present invention is to provide a method of machining an optical fiber positioning member, that being characterized as follows: more than one set of optical fiber guide grooves are formed in the top surface of a substrate plate by machining; a flat plate is joined to said substrate plate; the joined flat plate is machined with a cutting wheel such that part of the optical fiber guide grooves in the top surface of the substrate plate will become exposed, while the assembly is cut with a cutting wheel into discrete chips of positioning member wherein part of the optical fiber guide grooves is exposed.

BRIEF DESCRIPTION OF THE DRAWINGS

FIGS. 4A through 4C are schematic drawings of a multi-fiber optical connector ferrule according to one embodiment of the present invention, in which FIG. 4A is a longitudinal section, FIG. 4B is a cross section of FIG. 4A as taken on line $X_1$—$X_1$ and FIG. 4C is a section of FIG. 4A as seen from the side indicated by arrows $X_2$—$X_2$.

FIGS. 11A and 11B are schematic drawings of the guide capillary which is one component of the ferrule of the present invention, in which FIG. 11A is a perspective view and FIG. 11B is a perspective view of the guide capillary which is accommodated into a lower housing.

FIGS. 14A and 14B are schematic drawings of an optical fiber connector according to still further embodiment of the present invention, in which FIG. 14A is a front view of a ferrule end, and FIG. 14B is a top view of the ferrule without the flat plate shown in FIG. 14A.

FIGS. 17A and 17B are schematic drawings of an optical fiber connector according to a still further embodiment of the present invention, in which FIG. 17A is a perspective view and FIG. 17B is a longitudinal section taken through the center of the connector shown in FIG. 17A.

FIGS. 18A through 18D are schematic drawings of an optical fiber connector according to a still further embodiment of the present invention, in which FIG. 18A is a perspective view of an optical fiber guide member, FIG. 18B is a perspective view of a generally rectangular sleeve, FIG. 18C is a longitudinal section of the optical fiber connector with optical fibers in which the fiber guide member is accommodated in the generally rectangular sleeve, and FIG. 18D is a front view of the right-hand end of FIG. 18C with the optical fibers being taken away.

FIGS. 26A and 26B are schematic drawings of a multi-fiber optical connector ferrule that is produced by the machining method of the present invention, in which FIG. 26A is a perspective view and FIG. 26B is a longitudinal section of FIG. 26A.

DESCRIPTION OF THE PREFERRED EMBODIMENTS

Figure 1A:
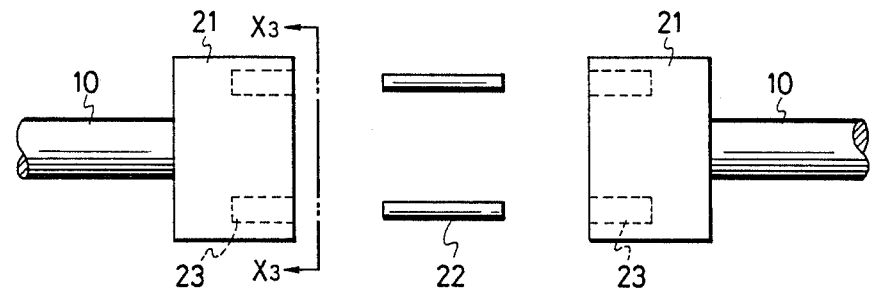
FIGS. 1A and 1B show the concept of a conventional structure of a multi-fiber optical connector ferrule which uses two guide pins in connecting two arrays of coated optical fibers.
Figure 1B:
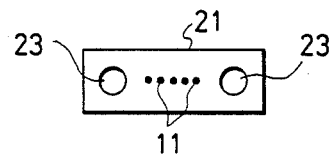
Figure 2A:
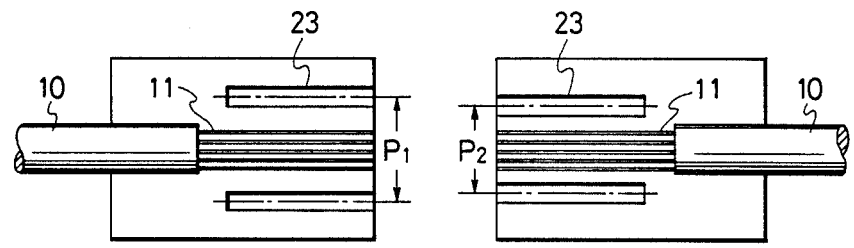
FIGS. 2A and 2B are schematic drawings illustrating the problems encountered in fiber coupling with the conventional connector ferrule.
Figure 2B:
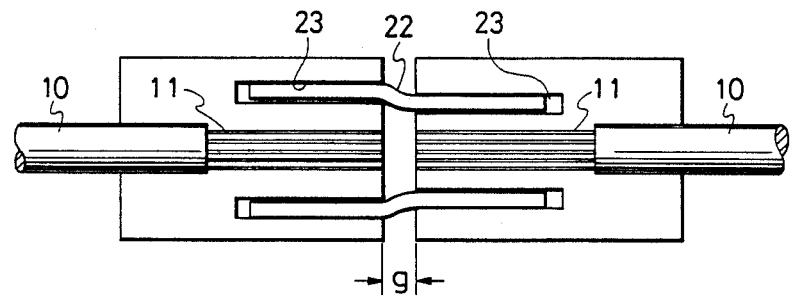
Figure 3:
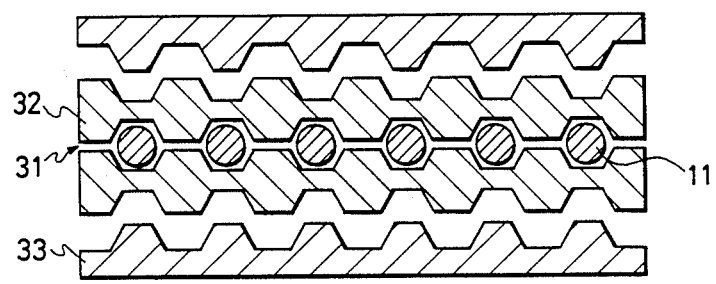
FIG. 3 is a sectional view of a multi-fiber optical silicon chip array connector, which is conventionally used as an optical fiber connecting member.
Figure 5:
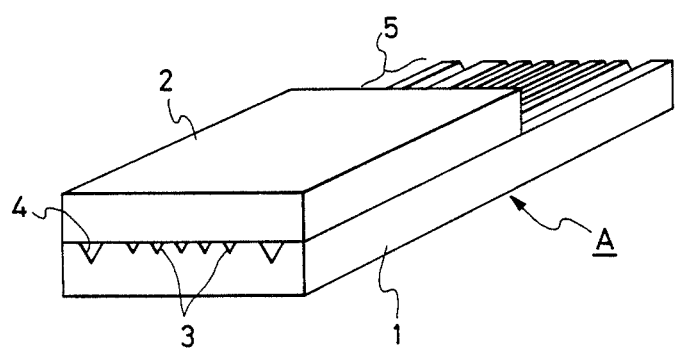
FIG. 5 is a perspective view of a positioning member that is a basic component of the multi-fiber optical connector ferrule of the present invention.
Figure 25:
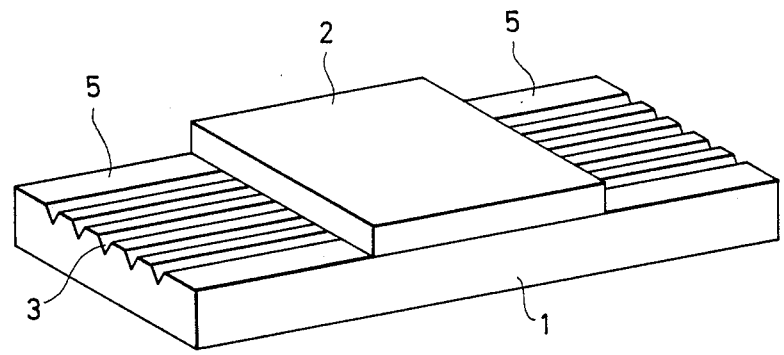
FIG. 25 is a perspective view of a multi-fiber precision sleeve or splicer that is produced by the machining method of the present invention.

First, it should be noted that FIGS. 5 and 25 are principal drawings showing a positioning member and a splicer according to the present invention.

The preferred embodiments of the present invention will be described with reference to the accompanying drawings.

Figure 4A:
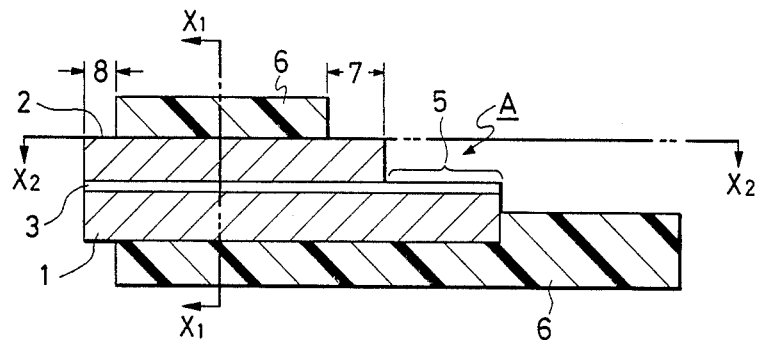
Figure 4B:
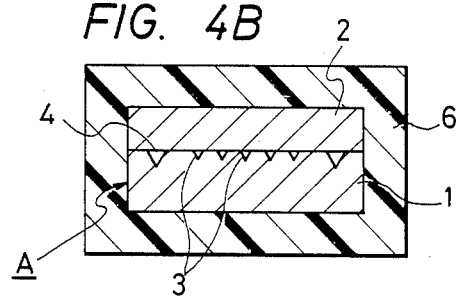
Figure 4C:
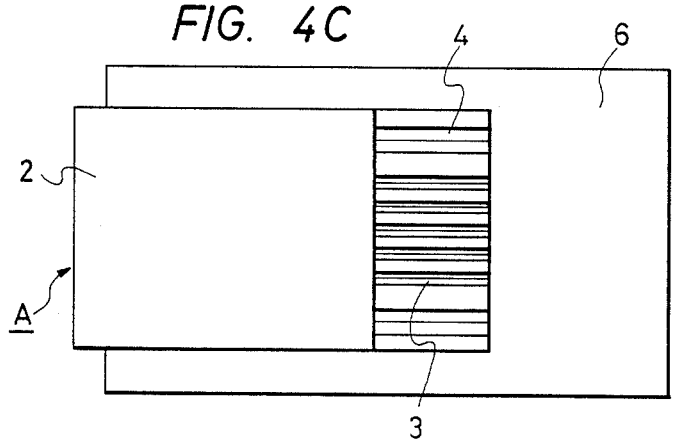

FIGS. 4A to 4C are schematic drawings of a multi-fiber optical connector ferrule according to one embodiment of the present invention. FIG. 4A shows a longitudinal section of the ferrule; FIG. 4B shows a cross section of FIG. 4A as taken on line $X_1-X_1$; and FIG. 4C shows a section of FIG. 4A as seen from the side indicated by arrows $X_2-X_2$. FIG. 5 is a perspectibe view of a positioning member (or a guide capillary) that is a basic component of the multi-fiber optical connector ferrule of the present invention. As shown in FIG. 4A and FIG. 5, the positioning member generally indicated at A is composed of a substrate 1 and a cover plate (or a flat plate) 2 each being formed of a hard and brittle material such as silicon, ceramics or glass. The substrate 1 is provided with optical fiber grooves 3 and guide pin grooves 4 that are formed by a high-precision grinding technique. The cover plate 2 is flat-surfaced on both sides and is shorter than the substrate 1 so that when the two elements are assembled together, part of the positioning grooves 3 and 4 will become exposed in an area 5. The exposed area 5 which is formed when the substrate 1 is combined with the cover plate 2 has the advantage of greatly facilitating the insertion of optical fibers 11 into the positioning member. In addition, this area permits the positioning member A to be combined with a plastic housing 6 (to be described below) without accomplishing an extra and tedious job of aligning the holes into which the optical fibers are to be inserted. As a result, the entire ferrule assembly can be constructed at a high production rate.

Figure 27:
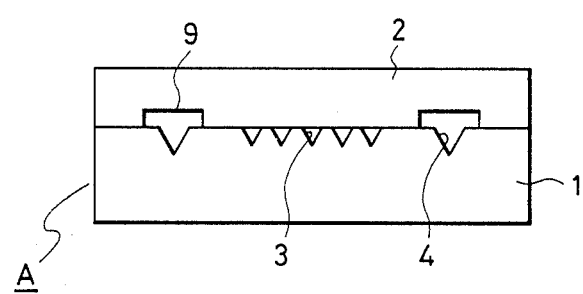
FIG. 27 is a sectional view of a positioning member according to a modified embodiment of the present invention.

The flat surface of the cover plate 2 defines optical fiber groove holes and guide pin groove holes for inserting the optical fibers and the guide pins. However, if parts of cover plate 2 surrounding the optical fibers or the guide pins are flat, the flat surface of the cover plate 2 may have steps 9 where the optical fiber groove holes or the guide pin groove holes are formed as shown in FIG. 27. As the optical fiber groove hole and the guide pin hole are essentially defined by an inscribed circle of the triangle which is formed by assembling the substrate 1 and the cover plate together, the optical fiber groove and the guide pin groove may be expressed as a V-shaped groove, respectively.

The positioning member A is accommodated within a plastic housing 6 by molding so as to provide a complete assembly of multi-fiber optical connector ferrule. The top of the plastic housing 6 is shorter than the length of the positioning member A so that the latter will form two projecting areas 7 and 8. These two projecting areas also serve as portions at which the positioning member A is pressed with an upper mold during transfer molding of the plastic housing 6.

Figure 6:
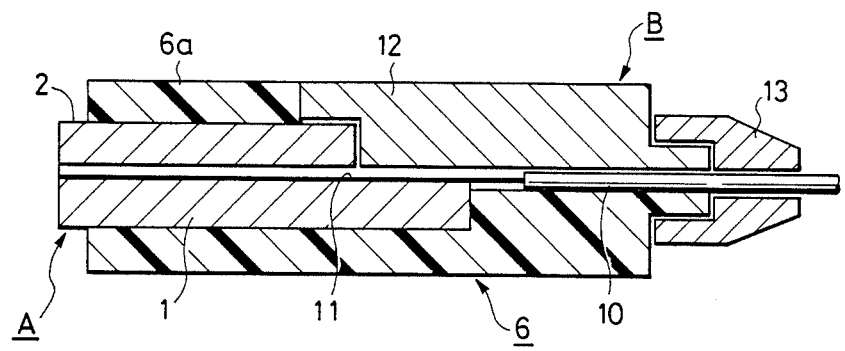
FIG. 6 is a longitudinal section of a multi-fiber optical connector employing the connector ferrule of the present invention shown in FIGS. 4A to 4C.

FIG. 6 shows a longitudinal section of a multi-fiber optical connector employing the connector ferrule of the present invention shown in FIGS. 4A to 4C. The individual optical fibers 11 in the coated fiber array 10 are fixed in alignment in the positioning member A along the fiber grooves 3, and a cover housing 12 is provided both on the exposed area 5 of the substrate 1 and on the exposed area 7 of the cover plate 2. A rubber boot 13 is provided at one end of each of the cover housing 12 and the plastic housing 6 so as to complete the multi-fiber optical connector B. At the other end of the connector, the positioning member A projects beyond the plastic housing 6.

Figure 7:
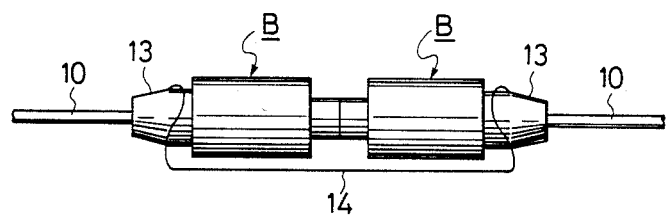
FIG. 7 is a general view of two coupled units of the connector shown in FIG. 6.

FIG. 7 shows the general view of two optical fiber connectors B coupled together. The units of the connector B shown in FIG. 6 are coupled together, with their alignment achieved by guide pins (not shown) inserted into guide pin grooves 3 provided in each of the positioning members A, and the coupling of the two optical fiber connectors B is secured by mounting a spring clip 14 over the connectors.

The conventional optical fiber connector ferrule the entire part of which is formed by plastic molding cannot be fabricated to a very high accuracy within 1 μm. The connector ferrule of the present invention employs a positioning member that is formed of a hard and brittle material which is highly susceptible to grinding (shaving), or an ultrahigh-precision machining technique and, as a result, the connector ferrule can be fabricated to a high accuracy within 1 μm. In particular, silicon is a material that is highly suitable for submicron grindability since it can be machined for a grinding (shaving) ratio of at least 30,000 to 40,000 or more if the grindstone and working conditions are properly selected. Machinable ceramics doped with magnesium oxide or sulfur, as well as glass are also capable of achieving high grinding ratios within the range of 10,000-20,000 and can advantageously be worked to provide extremely high accuracy or specular surfaces. Using a grindstone, the grinding (shaving) technique is capable of readily forming grooves having a length of 4-5 cm. Even if the grooves of this length are divided into as many as 10 sections, the individual grooves have a length of 4-5 mm, which is much longer than has been attainable by plastic molding.

In plastic molding that is employed to make the conventional optical fiber connector ferrule, dimensional variations due to moisture absorption and temperature changes are unavoidable because of the inherent properties of the resin material used. The connector ferrule of the present invention uses silicon, ceramics or glass as the material of the positioning member and they are much more thermally stable than plastics ($0.3-0.7 \times 10^{-5\circ}$ C. as compared with the plastic's $3 \times 10^{-5\circ}$ C. in terms of thermal expansion coefficient). Particularly high reliability and resistance to environmental factors can be attained by using quartz glass which has a thermal expansion coefficient of $0.5 \times 10^{-6\circ}$ C.

In the optical fiber connector ferrule of the present invention, the cover plate of the positioning member is shorter than the substrate so that part of the grooves formed in the surface of the substrate will become exposed when the two members are assembled together. The exposed area has the advantage of greatly facilitating the insertion of optical fibers into the optical fiber positioning member. In addition, this area permits the positioning member to be combined with a plastic housing without accomplishing an extra and tedious job of aligning the holes into which the optical fibers are to be inserted. As a result, the entire ferrule assembly can be constructed at a high production rate.

In the experiment of this embodiment, a substrate for a positioning member was prepared by automatic grinding of a 3 mm thick silicon chip with a diamond wheel having an edge angle of 60°. The same grinding wheel was used to form guide pin grooves and optical fiber grooves in the surface of the substrate, with the cutting depth of the wheel being appropriately adjusted. The making of optical fiber grooves assumed the incorporation of five optical fibers in a single coated fiber array and all of the grooves formed had a length of 50 mm. The variations in the pitch and depth of the grooves formed in the substrate were evaluated automatically for 100 samples (n=100) by optical measurement. The accuracy of grinding was found to be very high since the amount of offset from the design values was 0.23 $\mu$m on average and 0.47 $\mu$m at maximum.

The worked silicon substrate was divided into 10 sections, each of which was combined with a cover plate formed of a surface-ground silicon chip having a length of 8 mm, so as to prepare a positioning member having part of the grooves exposed by a length of 2 mm. The positioning member was then inserted into a mold and molded in an epoxy resin at low pressure to form an optical fiber connector ferrule having the construction shown in FIGS. 4A-4C, with the positioning member being accommodated in a plastic housing except for a portion that projected from an end of the plastic housing by a length of about 2 mm. An adhesive was injected into the optical fiber grooves before insertion of 10 single-mode fibers having an outer diameter of 125 $\mu$m and a core diameter of 10 $\mu$m. Thereafter, a cover housing was mounted and the projecting end of the positioning member was ground and polished to make a multi-fiber optical connector of the type shown in FIG. 6.

Two units of such multi-fiber optical connector were coupled together by inserting guide pins each having a diameter of 0.7 mm and the coupling was secured by means of a spring clip that was mounted over the connectors as shown in FIG. 7. Thereafter, the coupling loss and other performance characteristics of the connectors were evaluated. For 120 samples (n=120), the coupling loss was very low, ie, 0.22 dB on average and 0.62 dB at maximum, with an index-matching medium. The connector performance was very stable in that the variation in coupling loss was no more than 0.05 dB in a heat cycle test ($-30°$ C. to $+70°$ C.) and in a wet heat resistance test conducted at 60° C. and 95% RH. In addition, the connector ferrule of the present invention can be readily assembled because individual optical fibers have only to be slided into the ferrule after the fiber ends are brought into contact with the area in which the optical fiber grooves are exposed.

The multi-fiber optical connector of the present invention has the following advantages.

(1) The positioning member is formed of a hard and brittle material such as silicon or ceramics that has a grinding ratio of at least 10,000 and dimensional accuracies better than 0.5 $\mu$m can be achieved at a high production rate. As a result, multi-fiber optical connector ferrules can be fabricated with accuracies better than 1 $\mu$m which have been unattainable with the prior art product made by plastic molding.

(2) Because of this advantage, the ferrule of the present invention can satisfactorily be used in commercial fabrication of a multi-fiber optical connector for providing connection of single-mode fibers having a core diameter of 10 $\mu$m. The average coupling loss that occurs in the connector is only 0.22 dB and is much lower than the heretofore attainable values which are approximately 1-2 dB.

(3) By employing a grinding technique, optical fiber grooves as long as 4-5 mm can be formed and they permit optical fibers to be guided through the positioning member at a reduced bending angle. As a consequence, a low-loss multi-fiber optical connector ferrule can be attained.

(4) Alignment of optical fibers and guide pins is realized by means of a material that has a smaller thermal expansion coefficient than the heretofore used molded plastic part and, hence, a ferrule having superior heat stability can be attained. Since the material used also has high resistance to moisture absorption, the ferrule of the present invention is stable in exposure to wet heat.

(5) Part of the optical fiber grooves in the substrate is exposed and individual optical fibers can be readily inserted into the grooves with their ends being held in contact with this exposed area.

(6) The positioning member is accommodated in a plastic housing in such a manner that the former projects slightly from an end of the housing and this allows for efficient grinding polishing operations since they have only to be performed on the projecting end of the positioning member.

Figure 8:
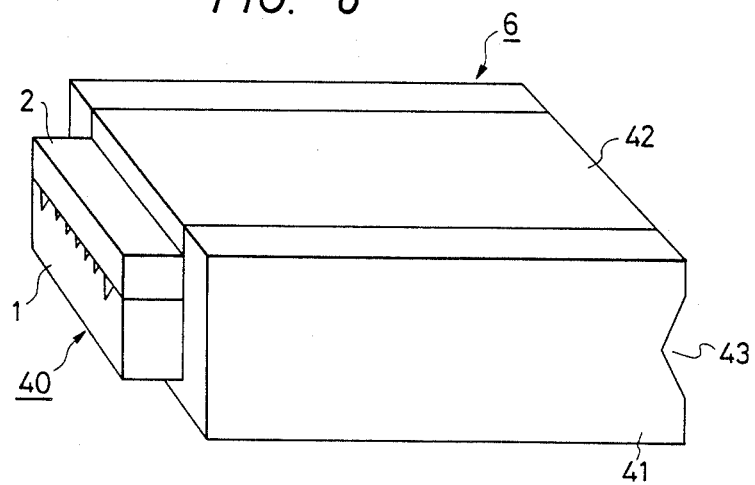
FIG. 8 is a perspective view of a multi-fiber optical connector ferrule according to another embodiment of the present invention.

FIG. 8 is a perspective view showing another embodiment of the multi-fiber optical connector ferrule of the present invention. As shown, the multi-fiber optical connector ferrule of the present invention has a guide capillary (or a positioning member) 40 accommodated within a housing 6. The guide capillary 40 is composed of a guide substrate 1 and a guide plate 2 that are bonded together, with the plate 2 being placed on the substrate 1. The housing 6 is composed of a combination of a lower housing 41 and a top housing 42. The lower housing 41 is provided at the rear end with a notch 43 into which a clamp 24 is urged when it is mounted over two units of the ferrule of the present invention to fix them in position as shown in FIG. 10B.

Figure 9:
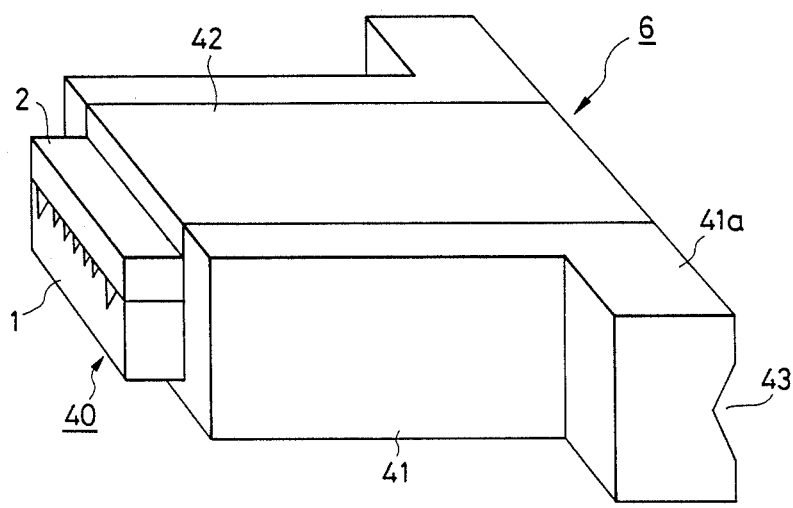
FIG. 9 is a perspective view of a multi-fiber optical connector ferrule according to a modified embodiment of the FIG. 8.

FIG. 9 shows a modified embodiment wherein the area that is to be present by the clamp is increased by forming a flange 41a on both sides of the rear end of the lower housing 41 as an integral part of the multi-fiber optical connector ferrule shown in FIG. 8.

Figure 11A:
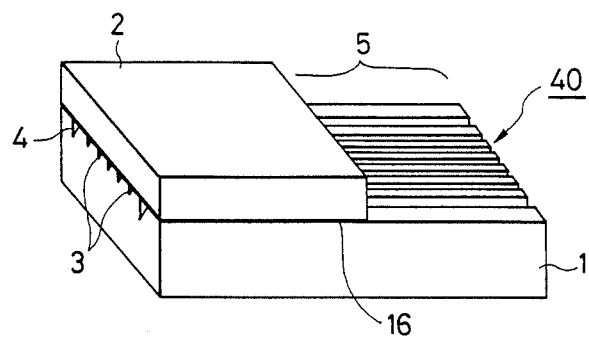
Figure 11B:
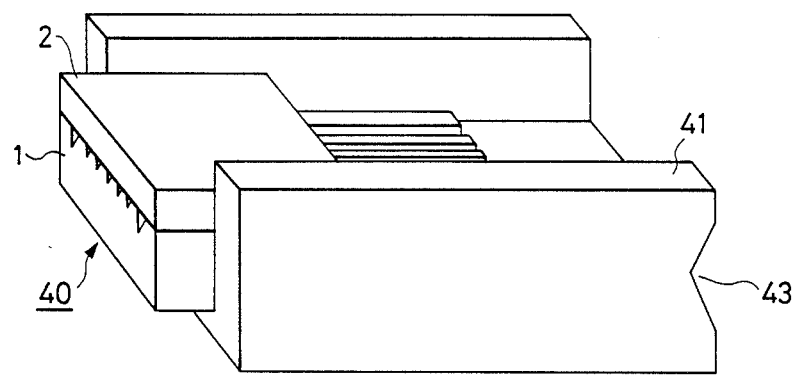

FIGS. 11A and 11B are schematic drawings of the guide capillary which is the principal component of the multi-fiber optical connector ferrule of the present invention; FIG. 11A is a perspective view and FIG. 11B is a perspective view of the guide capillary 40 of FIG. 11A that is accommodated into the lower housing 41.

The guide capillary 40 is a combination of the guide substrate 1 and the guide plate 2 that are bonded together with the plate 2 being placed on the substrate 1. Each of the guide substrate 1 and the guide plate 2 is formed of a hard and brittle material such as, for example, silicon, free-cutting ceramic or glass.

The top surface of the guide substrate 1 is provided with V-shaped optical fiber guide grooves 3 and guide pin grooves 4 that are formed by grinding (shaving) work. When the flat-surfaced guide plate 2 is placed on the guide substrate 1, groove holes are defined between the two members. The guide substrate 1 is longer than the guide plate 2 which is to be placed on it. The two members are bonded together with a thin layer of adhesive 16, which may be low-melting point glass, being provided therebetween. When the guide plate 2 is placed on the substrate 1 in registry at one end, part of the guide pin grooves 4 and optical fiber guide grooves 3 will become exposed in a longitudinal direction.

Figure 12:
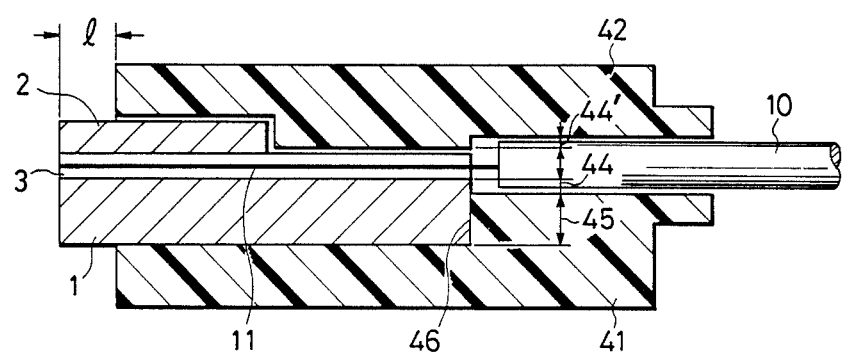
FIG. 12 is a longitudinal section of the multi-fiber optical connector ferrule of the present invention with optical fibers being installed in the ferrule.

The guide capillary 40 having the construction described above is accommodated into the lower housing 41, with one end of the capillary projecting beyond the housing (by a length l as indicated in FIG. 12) as shown in FIG. 11B. The top housing 42 is then placed over the guide capillary 40 to form a multi-fiber optical connector ferrule of the type shown in FIG. 8.

FIG. 12 is a longitudinal section of this multi-fiber optical connector ferrule with optical fibers 11 being installed in the ferrule.

Both the lower housing 41 and the top housing 42 that are to be combined with each other to make a complete housing 6 are formed by plastic molding. The shape of the lower housing 41 is such that it covers the lateral sides of the guide capillary 40 accommodated in it. The interior wall of the lower housing 41 is provided with a step 45 that assists in the positioning of the guide capillary 40 and a step 44 having a sufficient height to allow for fixing of an array of coated optical fibers 10. The inside wall of the top housing 42 is also provided with a step 44' whose height is sufficient to allow for fixing of the fiber array 10.

Figure 13:
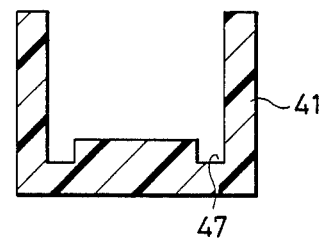
FIG. 13 is a cross section showing a modified embodiment of the lower housing wherein a groove is formed at the corners of its bottom.

After the guide capillary 40 is placed within the lower housing 41, the rear end of the capillary is brought into contact with the contact face 46 formed by the step 45 and fixed in position with an adhesive. As shown in FIG. 13, grooves 47 may be provided at the corners of the bottom of the lower housing 41 and such grooves serve as effective channels for relieving the adhesive used to bond the capillary 40 to the contact face 46.

Figure 10A:
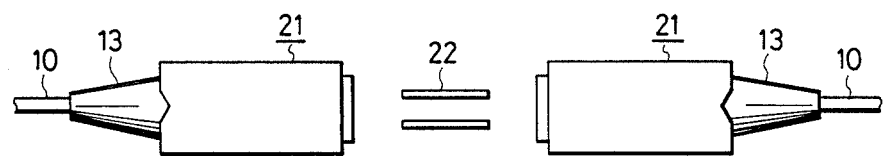
FIG. 10A is a schematic drawing of two units of the multi-fiber connector ferrule of the present invention in an uncoupled state.
Figure 10B:
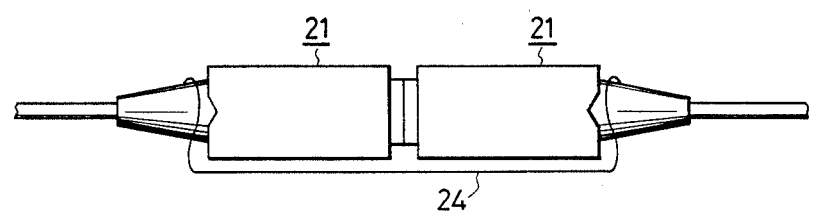
FIG. 10B is a schematic drawing of two units shown in FIG. 10A in a coupling state.

FIGS. 10A and 10B show how two units of the multi-fiber optical connector ferrule of the present invention are coupled together; FIG. 10A shows the ferrules in an uncoupled state and FIG. 10B shows them in a coupled state.

The two units of multi-fiber optical connector 21 are coupled together by means of two guide pins 22 and their coupling is secured by mounting a clamp 24 over the ferrules in such a manner that it engages the notch 43 in the rear end of each ferrule. The area of engagement between the clamp and each ferrule can be increased by forming flanges 41a in the rear end of the housing 6 as shown in FIG. 9. In FIGS. 10A and 10B, the numeral 13 denotes a rubber boot capped over the coated fiber array 10.

A wafer of silicon as a hard and brittle material was provided and optical fiber guide grooves and guide pin grooves were formed in the top surface of the wafer by performing continuous grinding (shaving) with a diamond wheel. As a result, a guide substrate assembly was produced. In the making of this assembly, one and the same diamond wheel was employed. A flat-surfaced silicon plate was provided in a separate step and its surface was oxidized. Thereafter, an adhesive such as photo-resist, or low-melting glass, was formed in a thin film (ca. 0.1 μm thick) on the oxidized surface of the silicon plate by a suitable technique such as sputtering, spin-coating or vacuum vapor. This silicon plate with a thin film of adhesive was placed on a predetermined area of the guide substrate assembly and the combination was heated at about 500° C., followed by cooling until the two members firmly adhered to each other. The unitary assembly was cut to chips of a predetermined shape so as to make guide capillaries.

Typical dimensions of the guide capillaries were as follows: 7 mm wide, 2.2 mm thick, 8 mm in overall length, and 3 mm for the length of the area where the optical fiber guide grooves were exposed. The guide substrate had two guide pin grooves (0.7 mmΦ) that were spaced from each other at a pitch of 3.6 mm while five optical fiber guide grooves were formed at a pitch of 0.3 mm. These V-shaped grooves were all formed at the same angle which was 60° in the experiment described above.

The guide capillary was subsequently placed within a lower housing that had been prepared by injection molding and the two members were fixed by bonding with an adhesive. The bottom of the lower housing had two steps, one being used to fix the guide capillary in position and the other providing an area that was as large as the size of the coated fiber array to allow it to be fixed in position. The overall length of the lower housing was 13 mm and the fiber array fixing area was 5 mm long.

As shown in FIG. 12, one end of the guide capillary projected slightly beyond the housing (by a length l) so as to facilitate subsequent grinding and polishing of the capillary end. The amount of projection of the capillary was about 0.5 mm in the experiment.

Five optical fibers were inserted into the guide capillary in the lower housing and were fixed in position with an adhesive. A top housing was placed on the capillary and combined with the lower housing to make a complete multi-fiber optical connector ferrule. The ferrule was then heat cured and the projecting end face of the capillary was ground and polished.

Two units of the so fabricated multi-fiber optical connector ferrule were coupled by means of two guide pins and securely fixed with a clamp in preparation for evaluation of the coupling performance of the ferrules. The optical fibers used were single-mode fibers each having a core diameter of 10 μm and an outer diameter of 125 μm.

With 50 samples (n=50) tested in the presence of an index-matching gel., the coupling loss was only 0.18 dB on average and 0.53 dB at maximum which was not much higher than the average value. As for the temperature characteristics, the samples experienced a loss variation within 0.1 dB in a heat cycle test ranging from −30° C. to +70° C. These results were due to the improved thermal expansion characteristics of silicon over the conventionally used plastics.

The coupling loss occurring in the ferrules of the present invention was very stable and experienced a variation within 0.05 dB when they were subjected to a wet heat resistance test for 10 days at 80° C. and 95% rh. After the ferrules had been subjected to 200 cycles (N=200) of a connect/disconnect test, the variation in the coupling loss was within 0.2 dB and, in addition, no unwanted phenomena such as wear and deformation had occurred.

Because of the nature of the machining technique employed, perfectly straight V grooves were obtained and this prevented the bending of optical fibers in the guide capillary. Silicon can be machined very efficiently to achieve a grinding ratio of at least 30,000; it is also highly amenable to precision machining and the edge obtained is sharp enough to provide great facility in performing dimensional measurements on the edge. These advantages are also attained if glass or free-cutting ceramics are used in place of silicon. Instead of low-melting glass, a low-viscosity resin which can be spin-coated such as a resist may be used as a thin-film forming adhesive.

The multi-fiber optical connector ferrule of the present invention has the following advantages.

(1) The guide capillary is formed of a hard and brittle material which can be machined by grinding to attain a high dimensional accuracy and production rate. In addition, the guide capillary formed of this hard and brittle material is free from any of the dimensional changes that frequently occur in the conventional product formed of molded plastic parts.

(2) Optical fiber guide grooves and guide pin grooves are formed by grinding, so that the chance of the bending of optical fiber guide holes is significantly lower than in the conventional product which is fabricated by using molding pins.

(3) In the prior art, connector ferrules are coupled by means of metal guide pins that are inserted into the guide pin holes formed by plastic molding and the guide pin holes are highly prone to deform as a result of repeated connect/disconnect cycles of the guide pins. This problem of deformed guide pin holes is absent from the guide capillary of the present invention which is formed of a hard and brittle material.

(4) The guide capillary which serves to fix optical fibers in alignment is made of a hard and brittle material. Since the hard and brittle material used in this invention will experience a by far smaller thermal expansion than the conventionally used plastics, the guide capillary attains significant improvement in matching with quartz-made optical fibers.

(5) The hard and brittle material is less prone to produce burrs as a result of machining and the guide capillary made of this material eventually provides facility in performing precise dimensional measurements.

(6) The guide capillary can be effectively reinforced being accommodated in a housing.

(7) The steps formed on the bottom surface of the lower housing provide ease in positioning the guide capillary and fixing an array of coated optical fibers in alignment.

(8) Guide groove holes having high dimensional accuracy can be formed by bonding the guide substrate and the guide plate with an intervening thin film of low-melting glass.

(9) the notch in the rear end of the lower housing provides an area which is to be pressed or urged with a clamp and this offers not only greater ease of assembling the connector ferrule but also improved uniformity in the pressure exerted on the ferrule.

(10) Since guide grooves having the same angle of are formed by machining with the same tool, precision working is achieved at a high production rate.

(11) The grooves formed at the corners of the bottom of the lower housing not only provide channels for relieving the adhesive used to bond the guide capillary to the lower housing but also eliminate the need to deburr the bottom edge of the capillary.

(12) The connector ferrule of the present invention can be fabricated at a very high production rate by employing a method that essentially consists of performing continuous machining to form guide grooves in the surface of a single wafer, then cutting the wafer to smaller functional chips.

Figure 14A:
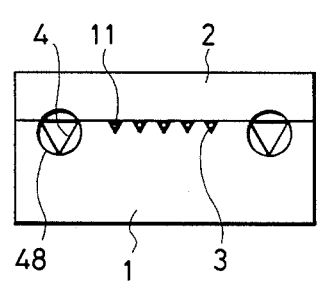
Figure 14B:
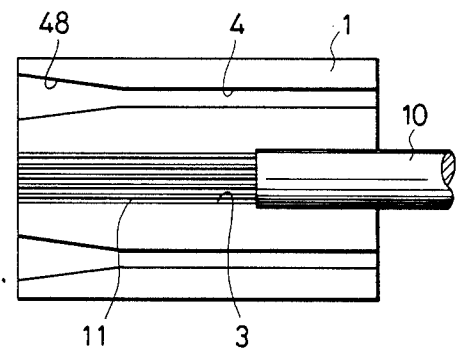

FIGS. 14A and 14B are schematic drawings of an optical fiber connector having guide pin insertion holes each of which is provided with an enlarged-clearance providing portion according to a specific embodiment of the present invention; FIG. 14A is a front view of a ferrule end, and FIG. 14B is a top view of the ferrule without the flat-surfaced plate shown in FIG. 14A.

In FIGS. 14A and 14B, the numeral 1 is a V-grooved substrate having optical fiber guide grooves 3 formed in its top surface and a guide pin hole 4 that is formed on both sides of the array of fiber guide grooves; 2 is a flat-faced plate that is joined onto the V-grooved substrate 1; 48 is an enlarged-clearance providing portion that extends from the inlet portion of the guide pin hole 4 to a certain depth in its axial direction and the diameter of the inlet portion of 48 is larger than that of the guide pin. In FIGS. 14A and 14B, 10 denotes an array of coated optical fibers, and 11 signifies optical fibers that are fixed in alignment with the optical fiber guide grooves 3 in the substrate 1.

Figure 15:
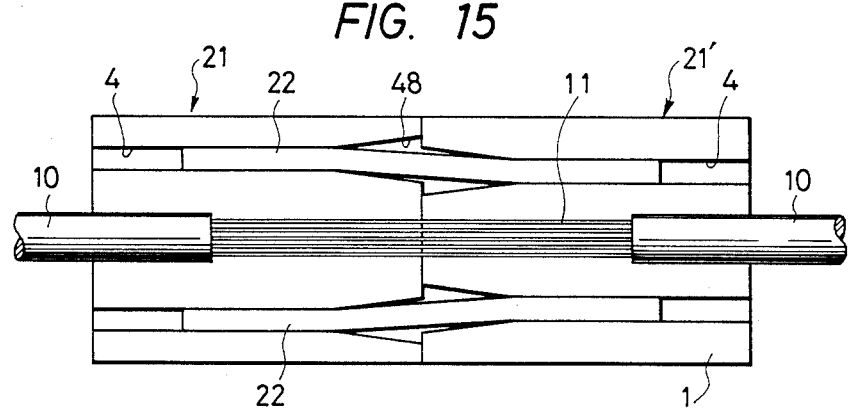
FIG. 15 is a top view of a ferrule that is connected to another ferrule having a different pitch between the two guide pin holes.

FIG. 15 is a top view of a ferrule 21 that is connected to another ferrule 21′ having a different pitch of guide pin holes 4 than in the ferrule 21. As shown, each of the guide pins 22 inserted into both ferrules will deform in the enlarged-clearance providing portion 48.

Figure 16:
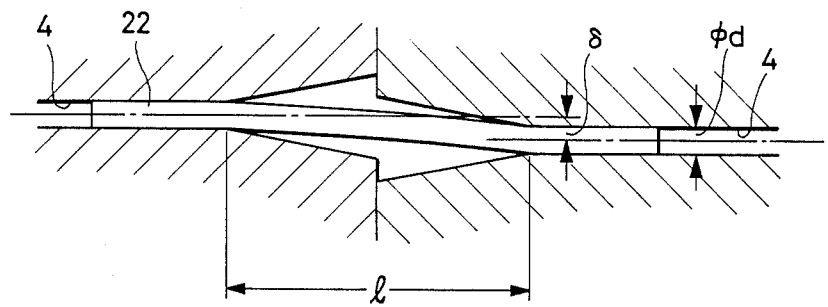
FIG. 16 is a schematic drawing that illustrates the mode of action of the enlarged-clearance providing portion shown in FIG. 15.

As shown in FIG. 16, if the diameter of the guide pin 22, its Young's modulus, the amount of its deformation, and the sum of the axial lengths of the two coupled enlarged-clearance providing portions are written as d, E, δ and l, respectively, then the bending stress, $\sigma_b$, and the shear force, $\tau$, developing at the base of the guide pin 22 are expressed by:

$$\sigma_b = \frac{3Ed}{l^2}\delta$$

$$\tau = \frac{3Ed^2}{4l^3}\delta$$

In order to ensure safe coupling of the two ferrules, $\sigma_b$, and $\tau$ must not exceed the values tolerated by the guide pin 22. Needless to say, the ferrule itself must have a strength greater than these values.

A simple calculation will clarify the point. If the permissible bending stress on the guide pin 22 is 100 kg/mm$^2$, E=21,000 kg/mm$^2$, d=0.35 mm and $\delta$=0.005 mm, then l is 1.05 mm. In other words, the enlarged-clearance providing portion 48 in one ferrule must have an axial length of at least about 0.53 mm. If the permissible shear stress on the guide pin is 35 kg/mm$^2$, l is 0.65 mm under the conditions specified above. Since this value is smaller than 1.05 mm calculated for the bending stress, the only factor that should be considered in determining the length of the enlarged-clearance providing portion is the bending stress in the case being discussed.

The shape of the enlarged-clearance providing portion may be such that it is generally tapered to a certain depth of the guide pin hole as shown in FIGS. 14B to 16. Alternatively, it may be a combination of a straight section that extends to a given depth and a tapered bottom section. It should be noted that various modifications may be made to provide an effective enlarged-clearance providing portion.

The above description concerns a multi-fiber optical connector ferrule but it should be understood that the concept of the present invention is also applicable to a single-fiber optical connector ferrule.

In the example of this embodiment, a silicon substrate was machined to form V-shaped optical fiber guide grooves and guide pin grooves. A flat-faced plate was joined to the top of the substrate to make a ferrule. An enlarged-clearance providing portion was provided in each of the guide pin grooves as shown in FIGS. 14A and 14B. Guide pins would be inserted into V-shaped guide pin grooves as if each of them was an inscribed circles of a triangle. The enlarged-clearance providing portions were formed to a depth of 0.6 mm with a drill having a diameter equal to that of a circle circumscribed about the triangular shape of each guide pin groove.

From the so fabricated samples of multi-optical fiber connector ferrule, those having a pitch of guide pin holes within the range of 4 mm±0.002 mm were selected and were randomly coupled by means of guide pins each having a diameter of 0.35 mm. Satisfactory coupling could be achieved even when the clearance between guide pins and guide pin holes was approximately 0.5 $\mu$m.

Two arrays of 8 single-mode optical fibers with a core diameter of 10 $\mu$m were connected with any two samples of the ferrule. For all the samples tested, the coupling loss was 0.35 dB on average and 0.82 dB at maximum. This data shows that any variation that occurred in the pitch of guide pin holes between two ferrules had been effectively absorbed.

As described in the foregoing pages, the optical fiber connector ferrule of the present invention has an enlarged-clearance providing portion formed in each of the two guide pin holes. Since any variation that occurs in the pitch between guide pin holes between two ferrules can be effectively absorbed by permitting inserted guide pins to deform in these enlarged-clearance providing portions, satisfactory coupling of optical fibers can be achieved consistently by using the ferrule of the present invention.

The enlarged-clearance providing portion also serves as an effective means for guiding the insertion of guide pins. In addition, any dust particles or those particles which are scraped off as a result of repeated mounting or dismounting of guide pins will be conducted into the enlarged-clearance providing portion, so that two ferrules can be directly coupled to each other without damaging their mating end surfaces.

Figure 17A:
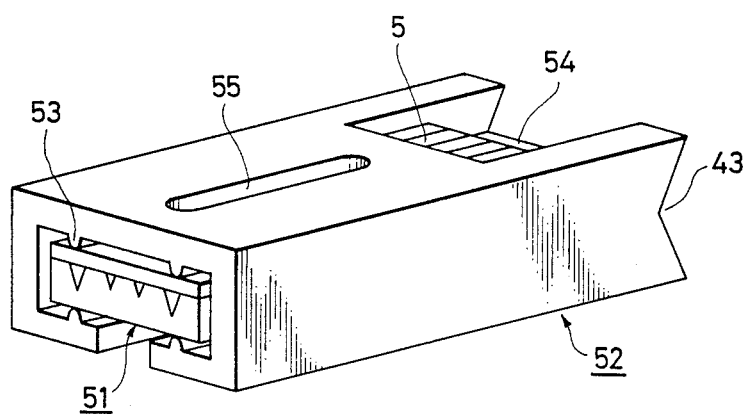
Figure 17B:
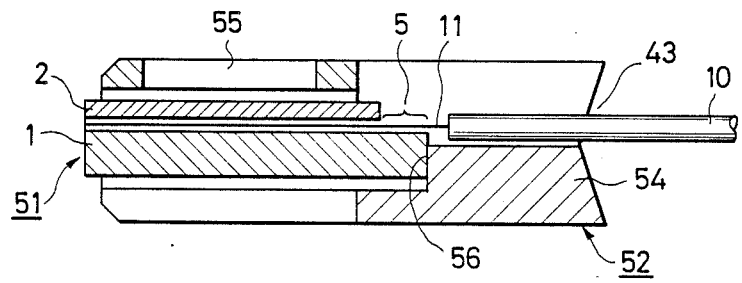

FIGS. 17A and 17B show a further embodiment in which the optical fiber guide member 50 is accommodated in a clamp member 52 and clamped thereby under pressure. In order to ensure that sufficient pressure is exerted on the guide member 51, two longitudinally extending ridges 53 are provided on the interior wall of the clamp member 52. In addition, the clamp member 52 is exposed in its rear portion such that its top surface provides an area 54 where the array of coated optical fibers 10 is to be fixed.

The clamp member 52 has a window 55 in its top surface which is situated above the optical fiber guide member 51. This window 55 permits the operator not only to observe the optical fibers 11 inside the clamp member but also to irradiate the fibers with ultraviolet rays for curing the resin used as fiber fixing adhesive. These two purposes can be attained more easily if the flat plate 2 is formed of a uv radiation permeable material such as glass or an acrylic resin.

In order to facilitate the operations of grinding and polishing the end surface of the optical fiber guide member 52, its end is rendered to project slightly from the clamp member 52 as shown in FIG. 17B. Alignment between the fiber guide member 51 and the clamp member 52 is attained by a step 56 provided on the interior wall of the clamp member. The rear end of the clamp member 52 has a notch 43 which is to engage a clip that exerts pressure for fixing the two mating connectors.

As described above, the clamp member 52 serves the following purposes: (i) it clamps the flat plate 2 and the grooved substrate 1 under pressure to form a unitary optical fiber guide member 51; (ii) it provides the area 54 where the array of coated optical fibers A is to be fixed; (iii) it offers a notch 43 which is to be pressed when the two mating connectors are coupled with a clip or any other fastening device; (iv) it provides a window 55 through which the operator can apply ultraviolet radiation and observe optical fibers 11 when he is fixing them in grooves with the aid of a uv curable adhesive resin; and (v) it protects the optical guide member 51 which is formed of a hard and brittle material.

In this embodiment, two grooves for insertion of guide pins (0.3 mm$\Phi$ and twelve grooves for insertion of optical fibers (0.125 mm$\Phi$) were cut in the top surface of a silicon substrate. A glass plate was joined to the top of the grooved substrate, with an intervening thin adhesive film being present in a thickness of about 0.3 $\mu$m, so as to make an optical fiber guide member. The glass plate was shorter than the grooved substrate such that the optical fiber grooves would become exposed in the guide member by a length of about 1 mm.

A clamp member was made by injection molding of a resin and a window was formed in its top in an area corresponding to part of the optical fiber grooves. As shown in FIG. 17A, two longitudinally extending ridges were formed on the interior wall of the clamp member so as to ensure uniform application of pressure on the optical fiber guide member. The fiber guide member was fixed in the clamp member by means of internal bonding.

An array of twelve single-mode fiber (core diameter, 10 μm; outside diameter, 125 μm) were inserted into the so fabricated connector and, after injecting a uv radiation curable adhesive, ultraviolet radiation was applied to complete the fixing of the optical fibers and the array of coated optical fibers in one operation. The curing of the adhesive was completed in about 30 seconds. The curing operation was performed with the exposed area of guide pin holes being sealed with rubber or other suitable materials so that the adhesive would not flow into the guide pin grooves.

Twenty samples (n=20) of the so fabricated 12-single-mode fiber connector evaluated for their performance. They achieved an average coupling loss of 0.18 dB with an index-matching medium. The lateral offset between cores was only about 1 μm. The coupling loss variation was no more than 0.05 dB in a heat cycle test ranging from −30° C. to +70° C. The connecting and disconnecting characteristics of the connectors were also very stable and the variation in coupling loss was within ±0.07 dB after 100 connect/disconnect cycles.

In the example discussed above, the grooved substrate was made of silicon but, needless to say, it may be formed of glass or a free-cutting ceramic.

In the example discussed above, the clamp member was made by plastic molding which is a fabrication technique adapted to mass production. Alternatively, the clamp member may be formed by pressing a metallic material with dies. If desired, the clamp member may be formed of a metal-resin composite; in this case, the composite may assume a variety of constructions, for example, a metal clip being used to form a portion that corresponds to the optical fiber guide member while the rear portion which provides an area for fixing an array of coated optical fibers is formed of a molded resin part in which the metal clip is inserted.

The window formed in the top of the clamp member may be of any sufficient size to permit the curing of internally injected resin with ultraviolet radiation and need not be large enough to render all of the optical fibers exposed. Since the ultraviolet radiation launched into the clamp member will travel along the fiber grooves as it is reflected randomly, the resin will cure even if it is within an area that is not beneath the window. For the purpose of bonding the optical fibers at high speed, irradiation of an uv curable adhesive with ultraviolet radiation is an effective method. However, a thermosetting resin or a two-part adhesive may be used as in the prior art. Even in this case, the presence of the window and the use of the transparent flat plate will allow the operator to observe the inside of the clamp member for checking the degree of resin filling or the presence of any unwanted bubbles.

The optical fiber connector discussed above has the following advantages.

(1) Clamping of the optical fiber guide member with the clamp member ensures the protection of a reliable joint between the two components of the guide member, viz., the flat plate and the grooved substrate.

(2) The flat plate which is formed of a transparent material and the provision of a window in the clamp member allow for easy checking of the optical fibers placed in the fiber guide member. In addition, a uv radiation curable resin can be used as an adhesive for the connection of optical fibers and this allows the optical fibers to be bonded and fixed within an appreciably reduced period of time.

(3) The clamp member attains the following objects simultaneously: formation of an area where an array of coated optical fibers can be fixed; formation of an area which can be pressed with a resilient clip, and protection of the optical fiber guide member.

(4) The longitudinally extending ridges that are formed on the interior wall of the clamp member facilitate uniform compression of the optical fiber guide member.

(5) The grooved substrate of the optical fiber guide member is formed of a hard and brittle material such as silicon and affords superior dimensional stability because said material has small thermal expansion coefficient and does not swell upon absorption of moisture. In addition, the substrate is free from burring and is adapted to measurements with high accuracy.

(6) An optical fiber connector can be readily assembled by simply inserting an optical fiber guide member into a clamp member that has been fabricated in a separate step by injection molding or any other suitable technique.

Figure 18A:
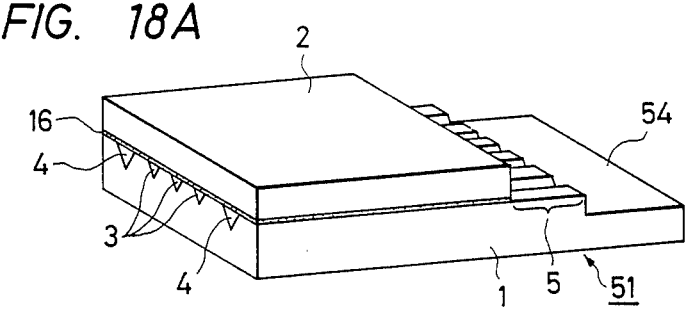
Figure 18B:
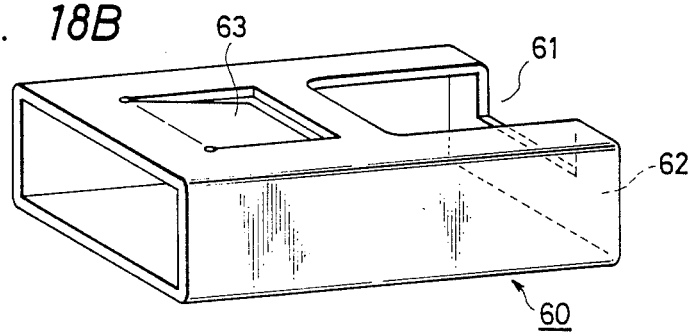
Figure 18C:
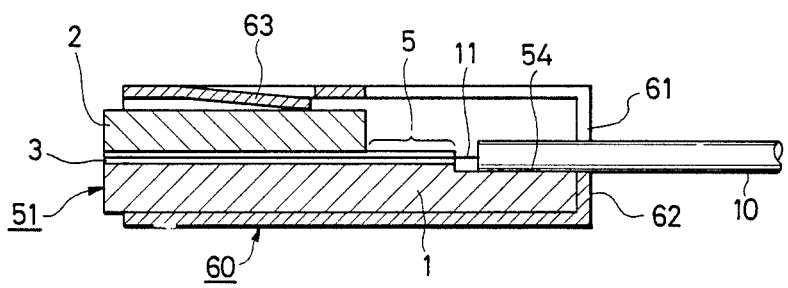
Figure 18D:
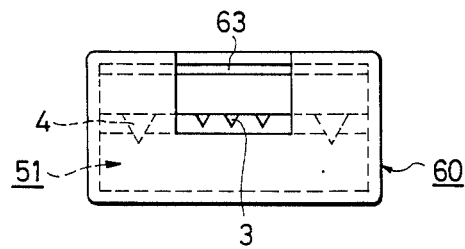

FIGS. 18A through 18D show schematic drawings of an optical fiber connector which is held in place under pressure within a generally rectangular sleeve according to a still further embodiment of the present invention for holding optical fibers in alignment; FIG. 18A is a perspective view of a perspective view of an optical fiber guide member 51 for holding optical fibers in alignment; FIG. 18B is a perspective view of a generally rectangular sleeve for fixing the optical fiber guide member 51 in place under pressure. FIG. 18C is a longitudinal section of the optical fiber connector of the present invention in which optical fibers 11 and an array of coated optical fibers 10 are held in alignment; and FIG. 18D is a front view of the right-hand end of FIG. 18C with the optical fibers and the array of coated fibers being taken away.

The optical fiber of the present invention is basically composed of the optical fiber guide member 51 and the generally rectangular sleeve 60 as shown in FIG. 18B. The optical fiber guide member 51 consists of a grooved substrate 1 having optical fiber guide grooves 3 and guide pin grooves 4 formed in its top surface, and a flat plate 2 that is joined to said substrate by means of intervening adhesive layer 16. This optical fiber 1 is accommodated and fixed under pressure in the sleeve 60.

As described above, the optical fiber guide member 51 is an assembly of the grooved substrate 1 and the flat plate 2 that have been joined together. The operator may simply insert optical fiber 11 into the respective guide grooves 3 without following the complicated procedures of assembling the conventional silicon chip array connector, which involve placing optical fibers on one etched silicon chip guide, then placing the other chip in alignment with the fibers. In order to facilitate the insertion of optical fibers 11, the optical fiber guide member 51 has in its rear portion an area 5 where part of the fiber guide grooves 3 is exposed. The rear portion of the guide member 51 also has a step which serves as an area 54 where an array of coated optical fibers 10 is to be fixed.

The grooved substrate 1 is preferably made of silicon which is adapted to high-precision grinding work but free-cutting ceramics, glass or high-precision molded plastic parts that experience low thermal expansion and moisture absorption may be used depending upon a specific application of the connector. The flat plate 2 may be formed of silicon or glass but if one wants to observe the inside of the fiber guide member or fix optical fibers 11 in the grooves 3 with a uv radiation curable adhesive, the flat plate is preferably made of glass which is permeable to ultraviolet radiation. For the purpose of making small optical fiber grooves 3 and large guide pin grooves 4 in the substrate 1, grinding (shaving) with a V-shaped whetstone is an efficient method. However, the same purpose may be attained by performing photoetching under controlled conditions or by conducting plastic molding with a precision mold. The connectors shown in FIG. 18A through 18D and 19A through 19E are intended for connecting multiple fibers but it should of course be understood that the concept of the present invention is also applicable to a single-fiber connector.

As shown in FIG. 18B, the generally rectangular sleeve 60 has a cantilevered, elastic compression imparting plate 63 formed in its top surface in an area where the flat plate 2 of the fiber guide member 51 is located. The elastic compressive force exerted by the plate 63 allows the fiber guide member 51 in the sleeve 60 to be fixed under pressure. The upper part of the rear end of the sleeve 60 is cut and and this cutout 61 allows for easy insertion of optical fibers 11. The rear end of the sleeve also has an area 62 which is to be pressed with a fastener. By coupling two connectors with a fastener which is to press a pressure portion 62, the grooved substrate 1 which is made of a hard and brittle material such as silicon is protected against damage. The generally rectangular sleeve 60 is preferably formed by pressing or punching of a metal but it may also be formed by plastic molding.

Figure 19A:
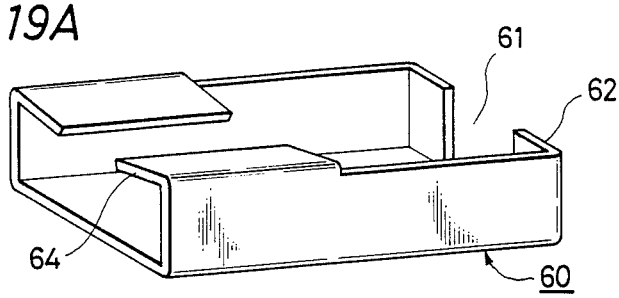
FIGS. 19A through 19E are respectively schematic drawings showing various modifications of the generally rectangular sleeve.
Figure 19B:
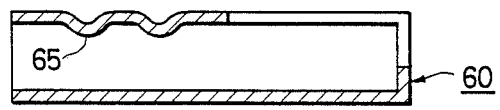
Figure 19C:
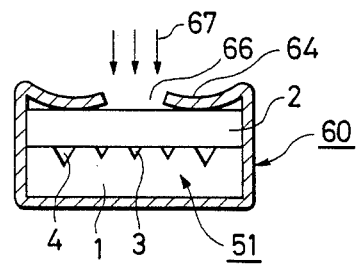
Figure 19D:
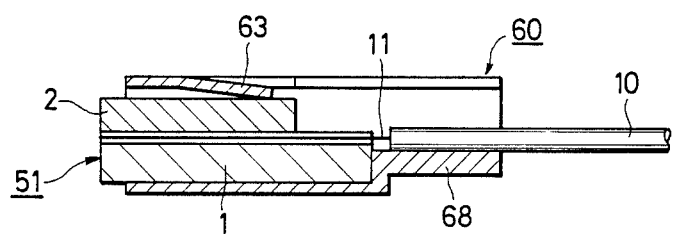
Figure 19E:
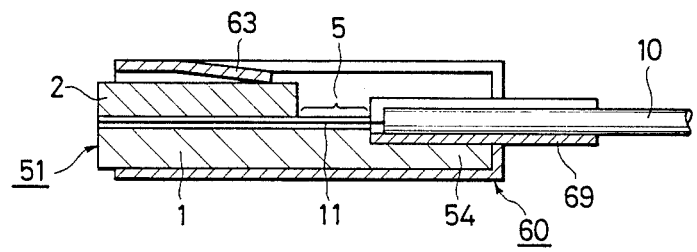

FIGS. 19A to 19E show various modifications of the generally rectangular sleeve 60. The sleeve shown in FIG. 19A has a clamp plate 64 on its top that extends laterally from opposite sides so as to exert an elastic compressive force on the fiber guide member 51. The sleeve shown in FIG. 19B has dips 65 formed in its top surface so that they will exert an elastic compressive force on the guide member 51. If an uv radiation curable adhesive is used to fix optical fibers 11, a generally rectangular sleeve 60 having laterally extending clamp plates 64 on both sides is preferably used (see FIG. 19C); in this case, a window 66 is formed between the clamp plates so that ultraviolet radiation 67 can be applied through the window. FIG. 19D shows an embodiment where the area for fixing an array of coated optical fibers is not formed in the fiber guide member 51; instead, a step 68 is formed in the rear portion of the generally rectangular sleeve 60 so as to provide an area for fixing the array of coated optical fibers. In this case, the other areas of the interior of the sleeve will serve as a guide for positioning the grooved substrate 1. In the embodiment shown in FIG. 19E, a reinforcing plate 69 for fixing the array of coated fibers is combined with a step 54 in the rear portion of the fiber guide member 51; this arrangement is effective to increase the length of bonding of the array of coated fibers so as to ensure reliable fixing of the fiber array.

Figure 20:
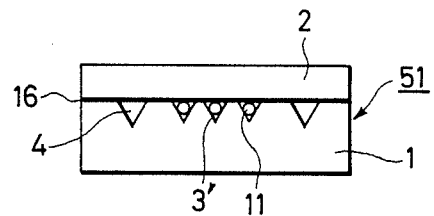
FIG. 20 is a schematic drawing showing a modified method of inserting optical fibers into the fiber guide member.

The other method of inserting optical fibers 11 into the fiber guide grooves 3 in the guide member 51 are hereunder described with reference to FIG. 20. As shown in FIG. 20, the grooved substrate 1 and the flat plate 2 may be bonded by spin coating an adhesive resin 16 in a thin film, say, no thicker than 0.5 μm, and optical fibers 11 are inserted into the resulting fiber guide holes 3'.

Figure 21:
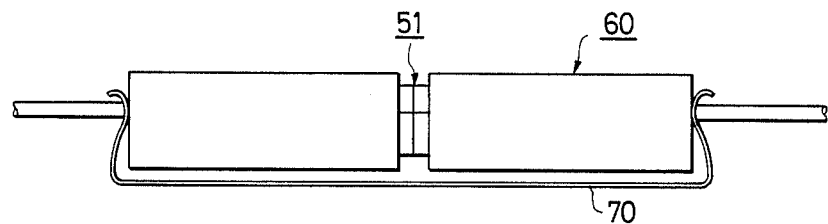
FIG. 21 is a side view showing two units of the connector of the present invention which are fixed in position with a fastener.
Figure 22:
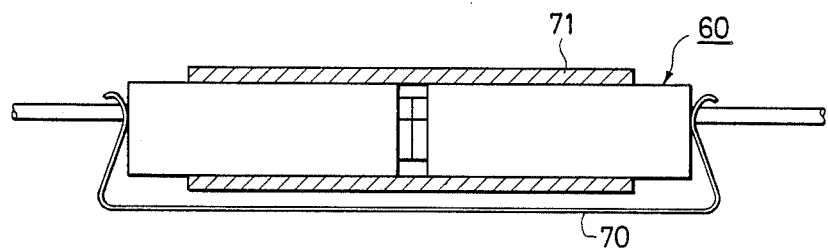
FIG. 22 is a side view showing two units of the connector which are accommodated in a generally rectangular sleeve having lateral clamp plates and fixed in position with a fastener.

FIG. 21 shows two units of the connector of the present invention that are coupled to each other with a fastener 70. In each unit, the optical fiber guide member 51 is accommodated in the generally rectangular sleeve 60 by one of the methods described above. FIG. 22 shows a modified method of coupling the two connectors; in this case, the two connectors are pressed into a generally rectangular sleeve 71 having lateral clamp plates and are coupled together with a fastener 70. The use of the second generally rectangular sleeve 71 has the advantage that the fiber guide member 51 will have no lateral offset with respect to the first generally rectangular sleeve 60. If the outer surface of the sleeve 60 of one connector is brought into alignment with the sleeve of the other connector to be coupled, guide pins can be readily inserted into the guide pin holes 4 in the fiber guide member 51, to thereby provide easier coupling of optical fibers in a highly consistent manner.

In the exampel, twelve optical fiber guide grooves were formed in the surface of a silicon wafer. The pitch between adjacent grooves was 0.25 mm. A groove for insertion of a 0.3 mmΦ guide pin was formed on both sides of the array of fiber guide grooves. A flat glass plate was joined to the grooved surface of the silicon wafer by means of a thin adhesive film of 0.3 μm thick. The assembly was cut into discrete chips of optical fiber guide member. An area where part of the optical fiber guide grooves would be exposed and an area where an array of coated optical fibers was to be fixed were formed in the same step as the assembly was cut into discrete chips.

A generally rectangular sleeve of the type shown in FIG. 19A was formed from a metal sheet having a thickness of 0.2 mm. Each of the chips of optical fiber guide member was accommodated in the generally rectangular sleeve and the so assembled optical fiber connector has an overall length of about 10 mm, with the width and height not exceeding 6 mm and 2.5 mm, respectively.

Twelve single-mode fibers (core diameter, 10 μm; outside diameter, 125 μm) were inserted into the connector and fixed with a uv radiation curable resin. These operations could be completed within a period of only 10 minutes.

Thereafter, the end surface of the connector was ground and polished. Two samples of the so prepared connector were coupled with guide pins (0.3 mmΦ) and fixed with a fastener. For fifty connected samples (n=50), the coupling loss was very low and only 0.23 dB on average. The temperature characteristics of these samples were very stable and the variation in coupling loss was within =0.08 dB in a heat cycle test ranging from −30° C. to +70° C. In a connect/disconnect test (n=20), the connector end faces of some samples were nicked but the variation in coupling loss was not great enough to potentially cause problems in practical applications because the difference between the initial coupling loss and that after the 20th connection was within ±0.1 dB.

The optical fiber guide of the connector had good handling properties since it was protected by the generally rectangular sleeve. In addition, the fiber guide was so small in size it was found to be well adapted for use with connector-equipped optical cables.

The optical fiber connector of the present invention has the following advantages.

(1) Insertion of optical fibers and assembly of a connector can easily be accomplished since an optical fiber guide member is preliminarily fabricated by joining a grooved substrate and a flat plate. Optical fibers can be inserted into the fiber guide member with greater ease if an area where part of the optical fiber guide grooves becomes exposed is formed in that guide member and if a cutout is formed in the upper portion of the rear end of the generally rectangular sleeve in which the guide member is to be accommodated.

(2) If an area where an array of coated optical fibers is to be fixed is formed in the rear portion of the optical fiber guide member, small connectors can be assembled in a high production rate.

(3) The optical fiber guide member is elastically clamped with the generally rectangular sleeve so that the connector will perform in a reliable manner without causing separation between the components of the guide member. For instance, no appreciable variation in coupling loss occurred in a test that was conducted for 100 hours at 80° C. and 90% RH.

(4) The circumference of the optical fiber guide member is protected with the generally rectangular sleeve. The reinforcing effect of the sleeve is particularly great when the guide member is made of a hard and brittle material such as silicon. If the rear end surface of the generally rectangular sleeve is provided with an area that is to be pressed with a fastener, two connectors can be coupled with a fastener without causing any damage to the fiber guide member.

(5) If the flat plate is made of a transparent material and a window is opened in the top surface of the generally rectangular sleeve, optical fibers inserted into the guide member can be fixed with a uv radiation curable adhesive, in which case the resin curing time which has been about 30 minutes in the prior art is reduced to less than 1 minute.

(6) An area for fixing an array of coated optical fibers can also be provided by forming a step in the rear portion of the generally rectangular sleeve.

(7) More reliable fixing of an array of coated fibers can be achieved by using a reinforcing plate for fixing the coated fiber array.

(8) An enlarged clearance that facilitates the insertion of optical fibers can be formed by using large-diameter guide pins or a heat-deformable hot melt adhesive. After the fibers are inserted into this enlarged clearance, the elastic compressive force of the generally rectangular sleeve effectively works to reduce the clearance and clamp the circumferential surface of each optical fiber.

The machining method of the present invention will be described hereafter with reference to the accompanying drawings.

First, during the experimental process, the following method has been carried out by the inventors.

Figure 23A:
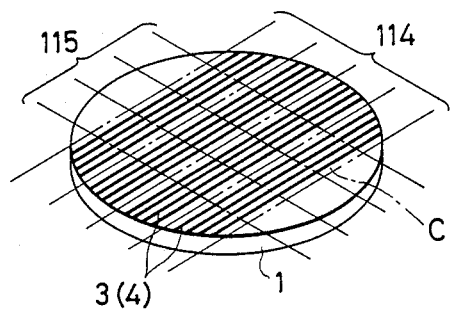
FIGS. 23A through 23D show the sequence of procedures according to one embodiment of the present invention.

As shown in FIG. 23A, a substrate plate 1 having multiple sets of optical fiber guide grooves 3 and guide pin grooves 4 formed in its top surface is cut along several lines in two different directions, one direction 114 being parallel to the grooves 3 and 4 and the other direction 115 being perpendicular to the direction 114, so as to obtain a plurality of chips C that serve as substrates provided with guide grooves.

Figure 23B:
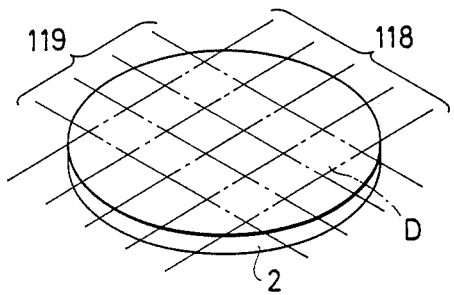
Figure 23C:
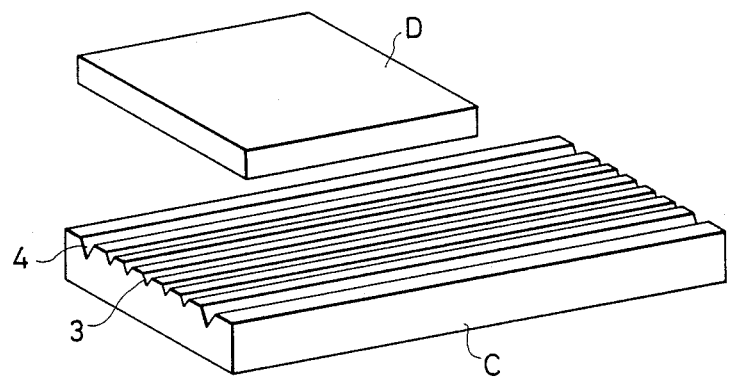

In a similar manner, a flat plate 12 is cut along several lines in two directions 118 and 119 that are perpendicular to each other, so as to obtain a plurality of flat plate chips D (see FIG. 23B). In order to facilitate the insertion of optical fibers into the optical fiber guide grooves 3, an individual flat plate chip D is made shorter than an individual substrate C so that part of the fiber guide grooves 3 formed in the substrate C will become exposed (see FIG. 23C).

Figure 23D:
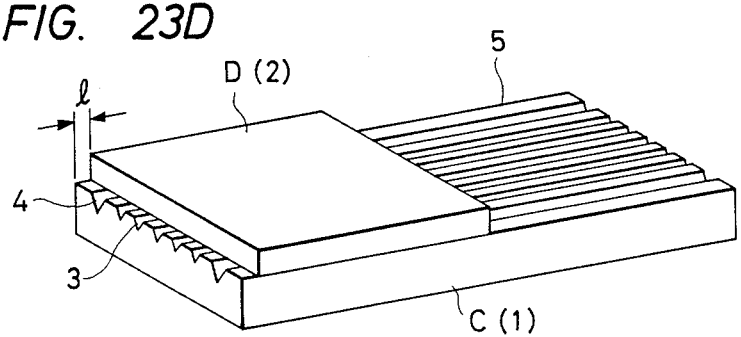

Thereafter, the flat plate chip D is bonded to the substrate chip C with a thin film of adhesive (see FIG. 23D). The end surface of the assembly is ground and polished to achieve the degree of flatness required for subsequent dimensional checking. Multiple optical fibers are then inserted into the guide grooves 3 and fixed in position by means of an adhesive. The end surface of the assembly is again ground and polished to obtain a multi-fiber optical connector ferrule. Before insertion of optical fibers, the end surface of the assembly is ground and polished to the degree of flatness required for dimensional checking because any substantial step present on the end surface will necessitate more than one focusing operation with a microscope during a single dimensional measurement.

However, the above-described first method of machining an optical fiber connector ferrule has the following problems.

(1) Cutting the substrate plate 1 and the flat plate 2 in different steps before joining individual substrate and flat plate chips together is quite time-consuming.

(2) Separated substrate chips C and flat plate chips D are too small to be handled efficiently and much time is required for joining them into an assembly.

(3) Great difficulty is involved in joining the substrate chip C and the flat plate chip D in such a manner that they are in complete registry at one end. This requires the residual edge mismach (indicated by l in FIG. 23D) to be eliminated by grinding and polishing operations before dimensional measurement is conducted.

The second machining method of the present invention is hereinafter described with reference to FIGS. 24A and 24E.

Figure 24A:
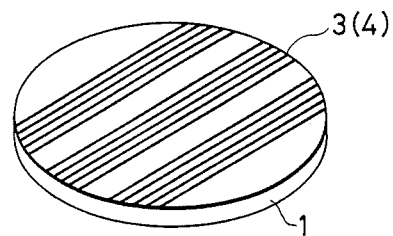
FIGS. 24A through 24E show the sequence of procedures according to another embodiment of the present invention.
Figure 24B:
Figure 24C:
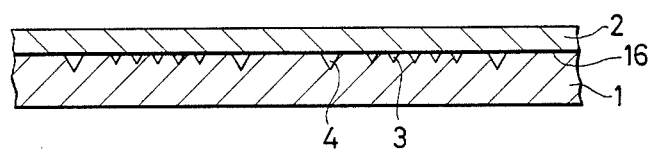

As shown in FIGS. 24A and 24B, the latter being a cross section of FIG. 24A, a substrate plate 1 which has in its top surface more than one set of guide grooves, each set consisting of a plurality of optical fiber guide grooves 3 and a guide pin groove 4 which is provided on both sides of each set of fiber guide grooves 3, is overlaid with a flat plate 2 with a thin film of adhesive agent 16 such as a photo-resist being present between the substrate plate and the flat plate, and the two members are joined together (see FIG. 24C). The adhesive agent 16 is applied to the entire surface of the flat plate 2 by spin coating, sputtering or vacuum vapor. The layer of adhesive agent 16 will vary with the specific use of the positioning member but spin coating is preferably performed with the rotational speed, resin material, temperature and other conditions being selected so as to attain a layer thickness of about 0.3 $\mu$m. In this case, small grooves may be formed either on the substrate plate 1 or on the flat plate 2 or on both plates so as provide an increased area of bonding and this is an effective method for attaining a stronger bond between the two plates.

Figure 24D:
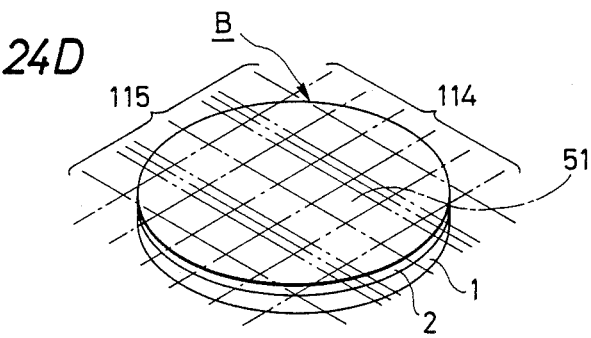
Figure 24E:
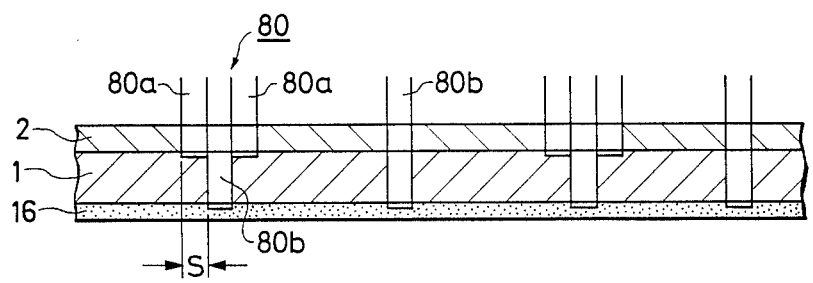

The so prepared guide member B is machined in a direction 115 parallel to the optical fiber guide grooves and in a direction 114 perpendicular to the direction 115 as shown in FIG. 24D, with the same cutting wheel being used to perform two machining operations, one intended for rendering part of the optical fiber guide grooves 3 exposed and the other for cutting the guide member B into discrete chips. In the first operation, a cutting edge 80a is applied through the flat plate 2 into a depth not exceeding the depth of the fiber guide grooves 3 so that a predetermined area of the flat plate 2 is removed to provide an area 5 where part of the fiber guide grooves 3 is exposed. In the cutting operation, the guide member B is cut with a cutting edge 80b to obtain discrete chips of guide member 51 (see FIG. 24E).

The same cutting wheel is employed in order to perform the two operations in a continuous fashion. If the width of the cutting edge is smaller than the length of the exposed area 5, the first operation may be carried out at several states until the intended length of exposed area is attained.

The discrete chips of guide member 51 produced by the above-described method of machining have flat cut surfaces at their end and need not be subjected to end preparation that is required in the first method of the invention before performing dimensional inspection. In addition, there is no need to join the individual chips to each other. As a result, the overall time of machining is significantly reduced to ensure substantial improvement in the production rate.

The foregoing description concerns the case where the machining method of the present invention is used to fabricate a multi-fiber optical connector ferrule. The method is also applicable to the machining of a multi-fiber precision sleeve or splicer having the construction shown in FIG. 25, wherein only optical fiber guide grooves 3 are formed in a guide substrate 1 and a flat plate 2 is placed on the substrate in such a manner that the guide grooves are exposed on both sides of the plate 2. In this case, the flat plate 2 is preferably made of glass or any other transparent material that enables the operator to check to see if optical fibers are correctly connected in the sleeve.

Figure 26A:
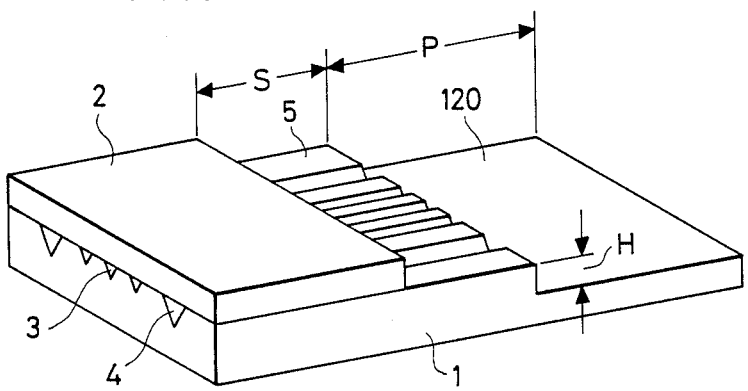
Figure 26B:
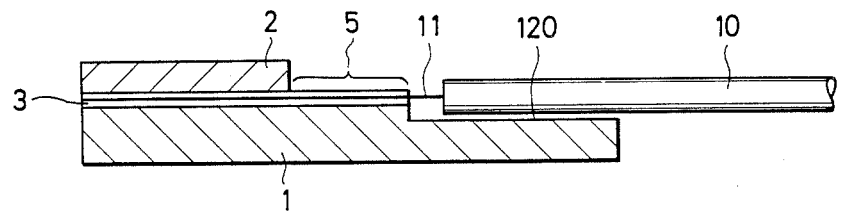

Another application of the machining method of the present invention is shown in FIGS. 26A and 26B. In this application, a step H for providing an area P where an array of coated optical fibers 10 is to be fixed can be produced by performing multiple machining operations with the same grindstone. For instance, in order to produce a fiber array fixing area P having a length of 5 mm, at least fiber stages of machining may be performed with a grinding wheel having an edge width of no less the 1 mm.

The machining method of the present invention was used to make discrete chips of guide member from a starting guide member that consisted of a flat silicon plate joined to a substrate plate prepared by forming more than one set of guide grooves (each consisting of a plurality of optical fiber guide grooves and a guide pin groove disposed on both sides of each set of fiber guide grooves on a silicon wafer by a grinding technique.

In the example, grooves 20 μm deep were cut in the surface of the flat silicon plate in order to provide an increased area of bonding. A low-viscosity adhesive agent was spin-coated onto the grooved surface of the flat plate to form an adhesive layer in a thickness of 0.2 μm. The flat plate was then placed, with the adhesive-coated surface facing down, on top of the grooved substrate plate, and the two members were joined together with a pressure of 0.1 kg/cm² being applied at about 80° C. for 1 hour.

The so prepared starting guide member was machined with a diamond wheel (edge width: 1 mm) so as to provide an area where part of the fiber guide grooves was exposed. Using the same wheel, the guide member was cut into discrete chips of a multi-fiber optical connector ferrule having the construction shown in FIG. 5.

Compared with the first machining method, the second method of the present invention obviated not only the need to join individual chips but also the need to effect end preparation by subsequent polishing and grinding techniques and, as a result, the production rate achieved by this method was at least several tens of times higher than the conventional method.

While the method of the present invention has been described with reference to the production of a member that is intended for positioning multiple optical fibers, it should be understood that the method is also applicable to the production of single-fiber connectors, precision sleeves and splicers, and that the multiple optical fibers which are to be positioned by said member may be a strand of single coated fibers or a flat array of coated fibers formed into a tape.

According to the second machining method of the present invention, the following advantages are attained.

(1) In the first method, individual chips have to be joined together but this is unnecessary in the second method of the present invention and significant improvement in the production rate is achieved.

(2) Since the chips produced by cutting the substrate plate and the flat plate after they have been joined together have flat ends, they need not be subjected to further end preparation by grinding and polishing work as in the first method and attendand improvement in the production rate is attained.

(3) An operation for producing an area where part of the optical fiber guide grooves is exposed and the step of cutting and starting guide member into discrete chips can be accomplished continuously using the same cutting wheel and this also leads to an improved production rate.

(4) The substrate plate can be joined to the flat plate by spin coating with a thin adhesive film being formed between the two plates.

(5) An even stronger bond can be attained between the substrate plate and the flat plate by joining them together with small grooves being cut in either plate or both plate in order to provide an increased area of bonding.

(6) If formation of a step that produces an area for fixing an array of coated optical fibers is effected is included within the machining method of the present invention, the discrete chips of positioning member alone are sufficient to fix an array of coated fibers and there is no need to combine them with any other component to form an area for fixing the array of coated fibers. This contributes to an appreciable improvement in the production rate of optical fiber connectors, precision sleeves and splicers.

As described above, the optical connector and splicer according to the present invention can realize high-precision coupling of optical fibers and be constructed at a high production rate.

What is claimed is:

1. An optical connector for use in the coupling of optical fibers, said connector being disposed to be connected to an identical optical connector by two guide pins only, said connector comprising:
- a substrate plate having at least one optical fiber groove and at least one guide pin groove each formed at one surface thereof for positioning said at least one optical fiber and said guide pins, respectively; and
- a flat plate mounted on said substrate plate, and having a flat surface confronting said one surface on said substrate plate so as to expose at least a part of said optical fiber, said flat plate being joined to a partial area of said substrate plate for defining at least one optical fiber holding portion and at least one guide pin holding portion, a remaining area of said substrate plate, where said flat plate is not joined, defining an exposed area for facilitating insertion of said optical fiber into said optical fiber holding portion said exposed area having a step at a side thereof for fixing a coated optical fiber.

2. An optical connector as claimed in claim 1, wherein said substrate and flat plates are made of a hard and brittle material.

3. An optical connector as claimed in claim 1, further comprising an adhesive thin layer formed between said substrate plate and said flat plate for bonding said flat plate to said part area of said substrate plate.

4. An optical connector as claimed in claim 2, wherein said hard and brittle material is formed of silicon.

5. An optical connector as claimed in claim 2, wherein said hard and brittle material is formed of ceramics.

6. An optical connector as claimed in claim 2, wherein said hard and brittle material is formed of glass.

7. An optical connector as claimed in claim 3, wherein said adhesive thin layer is made of a low-viscosity and spin-coatable resin.

8. An optical connector as claimed in claim 7, wherein said low-viscosity and spin-coatable resin is a photoresist.

9. An optical connector as claimed in claim 1, further comprising a housing which surrounds said substrate plate and flat plate for protecting and pressing said substrate plate and flat plate together.

10. An optical connector as claimed in claim 1, wherein each of said guide pin holding portion has an open end portion, which portion provides enlarged clearance.

11. An optical connector as claimed in claim 1, wherein said optical fiber groove and said guide pin grooves are V-shaped.

12. An optical connector as claimed in claim 11, wherein said optical fiber groove and said guide pin grooves have the same angle of V.

13. An optical connector as claimed in claim 1, said optical fiber holding portion and guide pin holding portion are defined by an inscribed circle of a triangle.

14. An optical connector as claimed in claim 1, wherein said flat plate is made of a transparent material.

15. An optical splicer for permanently connecting an optical fiber, comprising:
- a substrate plate having at least one optical fiber groove formed on an upper surface thereof for positioning said at least one optical fiber along said optical fiber groove;
- a flat plate having a length shorter than said substrate plate, and flat plate being joined to a part area of said substrate plate for defining at least one optical fiber groove hole, remaining area of said substrate plate, where said flat plate is not joined, defining exposed areas for facilitating an insertion of said optical fiber into said optical groove hole, said exposed areas being formed on both longitudinal sides of the upper surface of said substrate plate, said substrate plate and flat plates being made of a hard and brittle material.

16. An optical splicer as claimed in claim 15, wherein said flat plate is made of a transparent material.

* * * * *